Sept. 12, 1950  F. L. STUMP  2,522,144
INTEGRATED AIRPORT
Filed Aug. 18, 1947  6 Sheets-Sheet 1
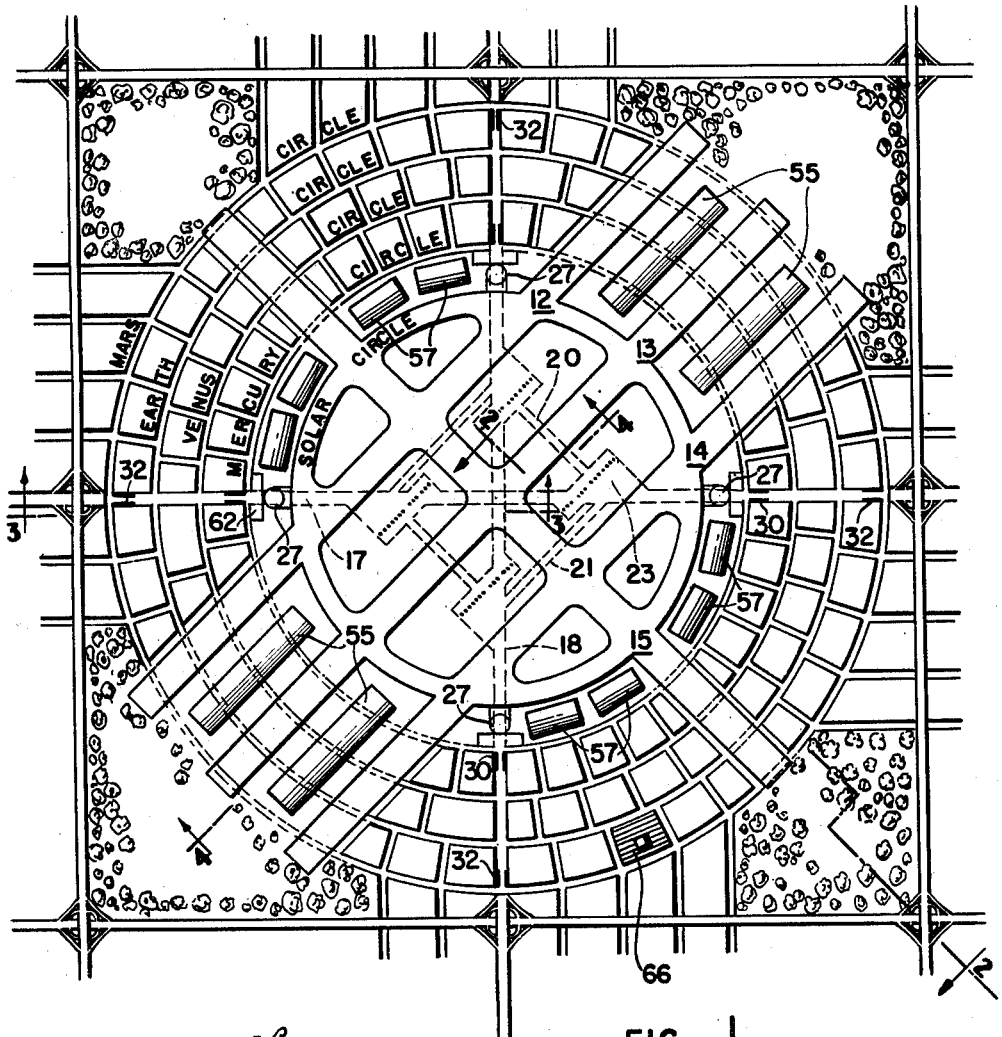
FIG_1
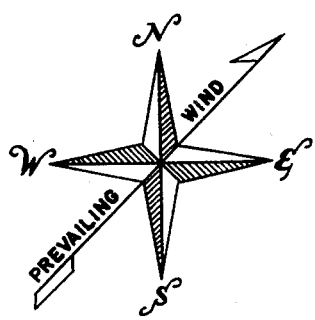
FRED L. STUMP
*INVENTOR.*
BY *Smith & Tuck*
ATTORNEYS Sept. 12, 1950  F. L. STUMP  2,522,144
INTEGRATED AIRPORT
Filed Aug. 18, 1947  6 Sheets-Sheet 2
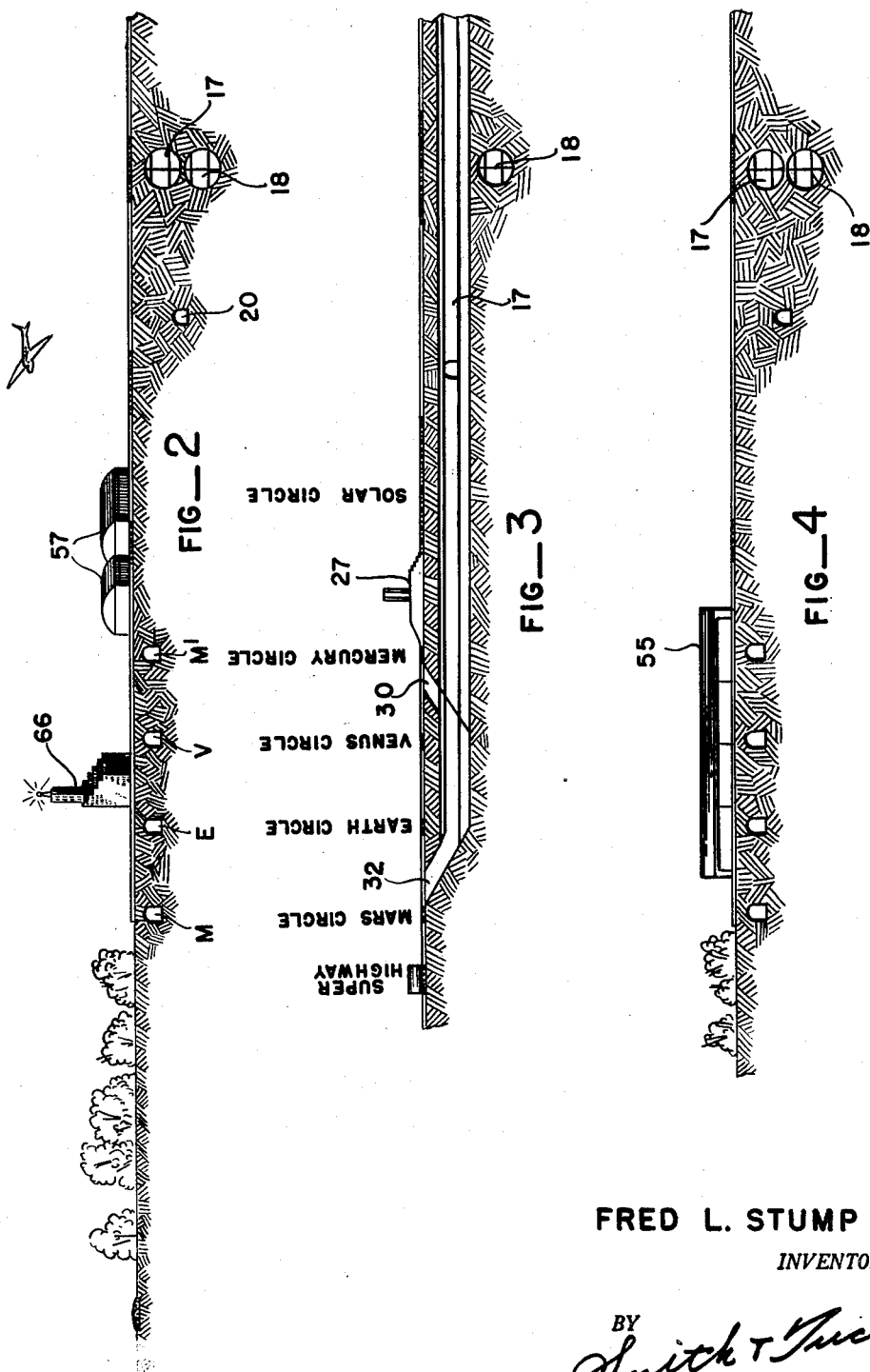
FRED L. STUMP
*INVENTOR.*
BY Smith T Tuck
ATTORNEYS

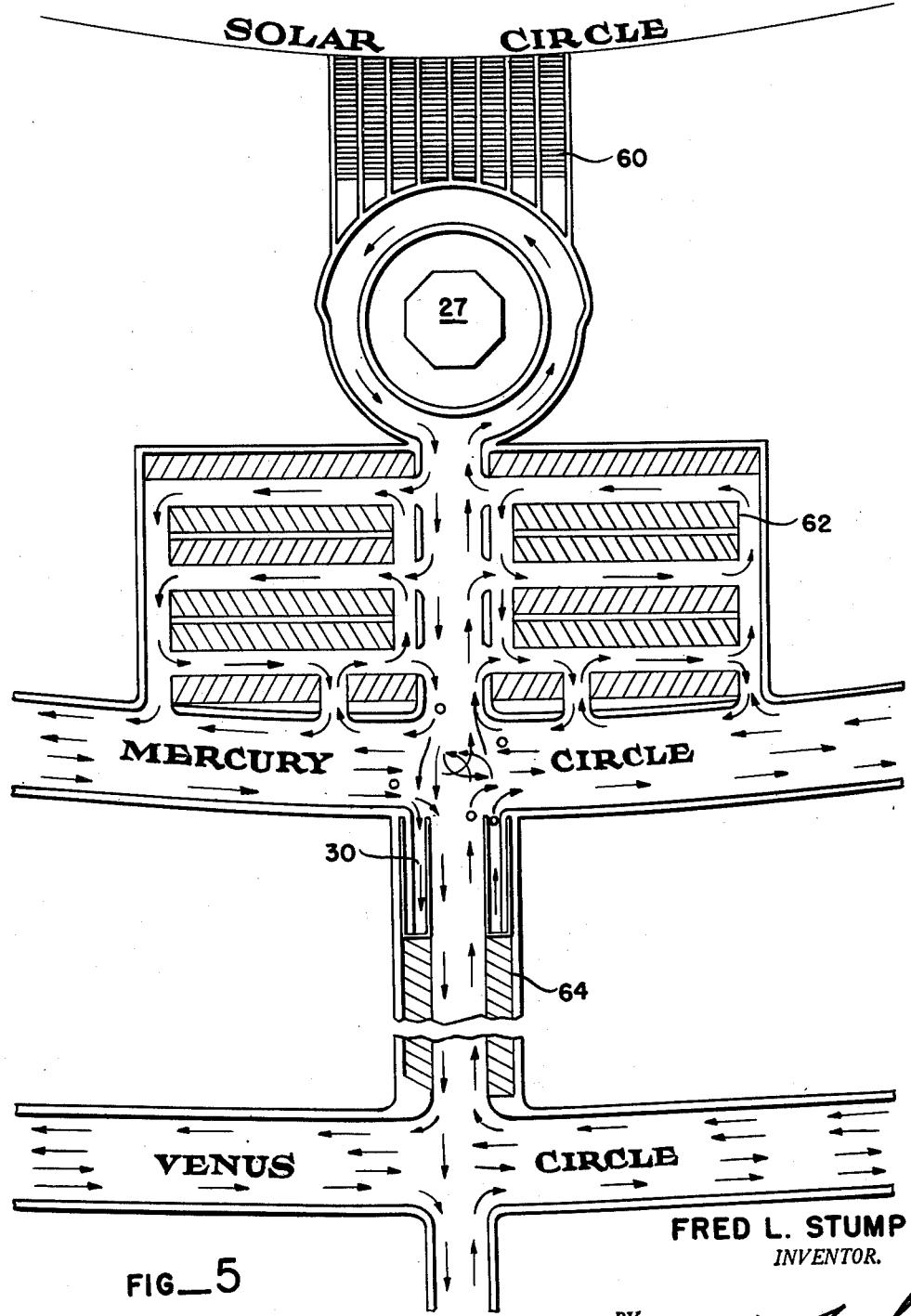

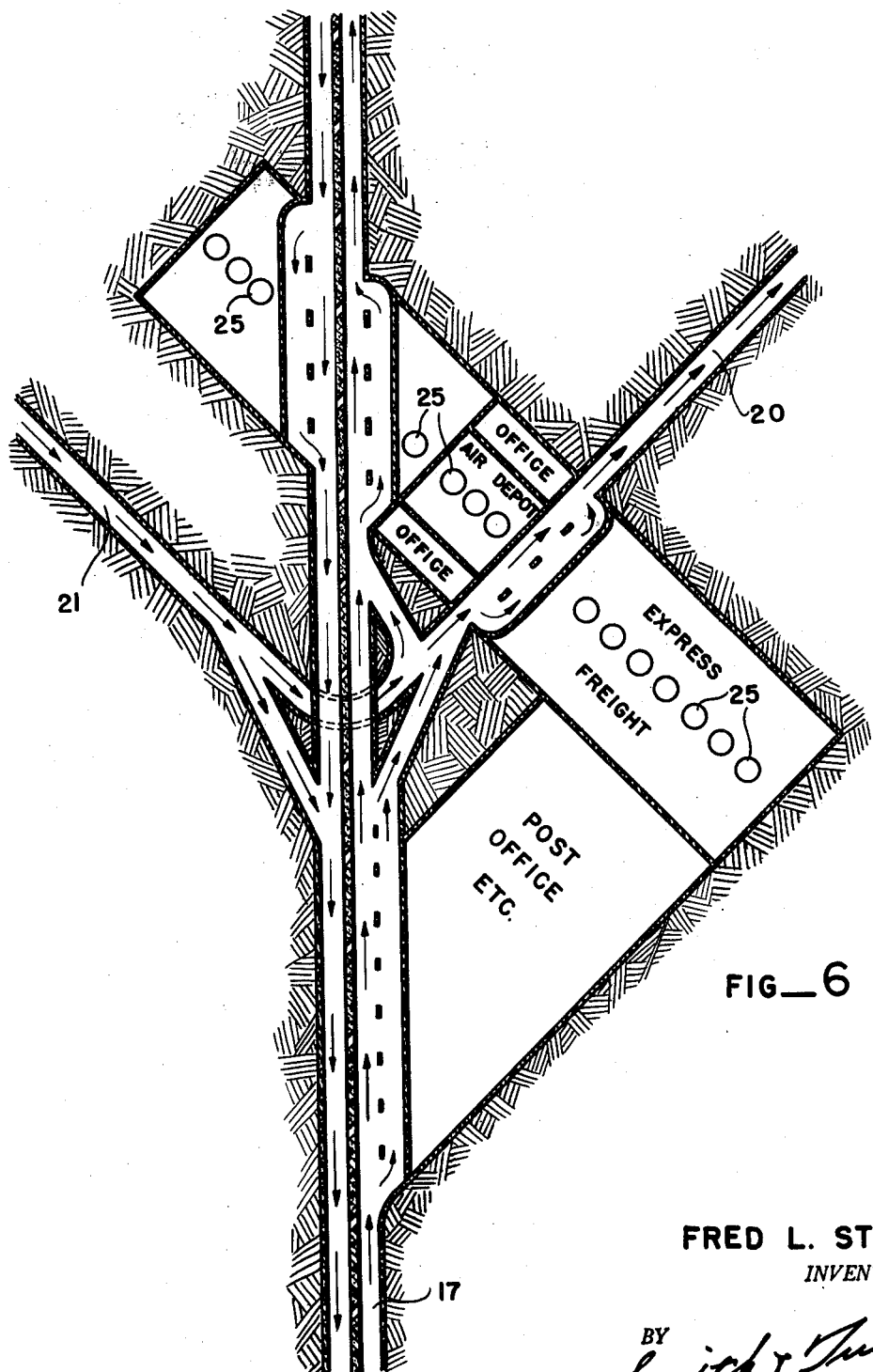

Sept. 12, 1950 F. L. STUMP 2,522,144
INTEGRATED AIRPORT
Filed Aug. 18, 1947 6 Sheets-Sheet 5
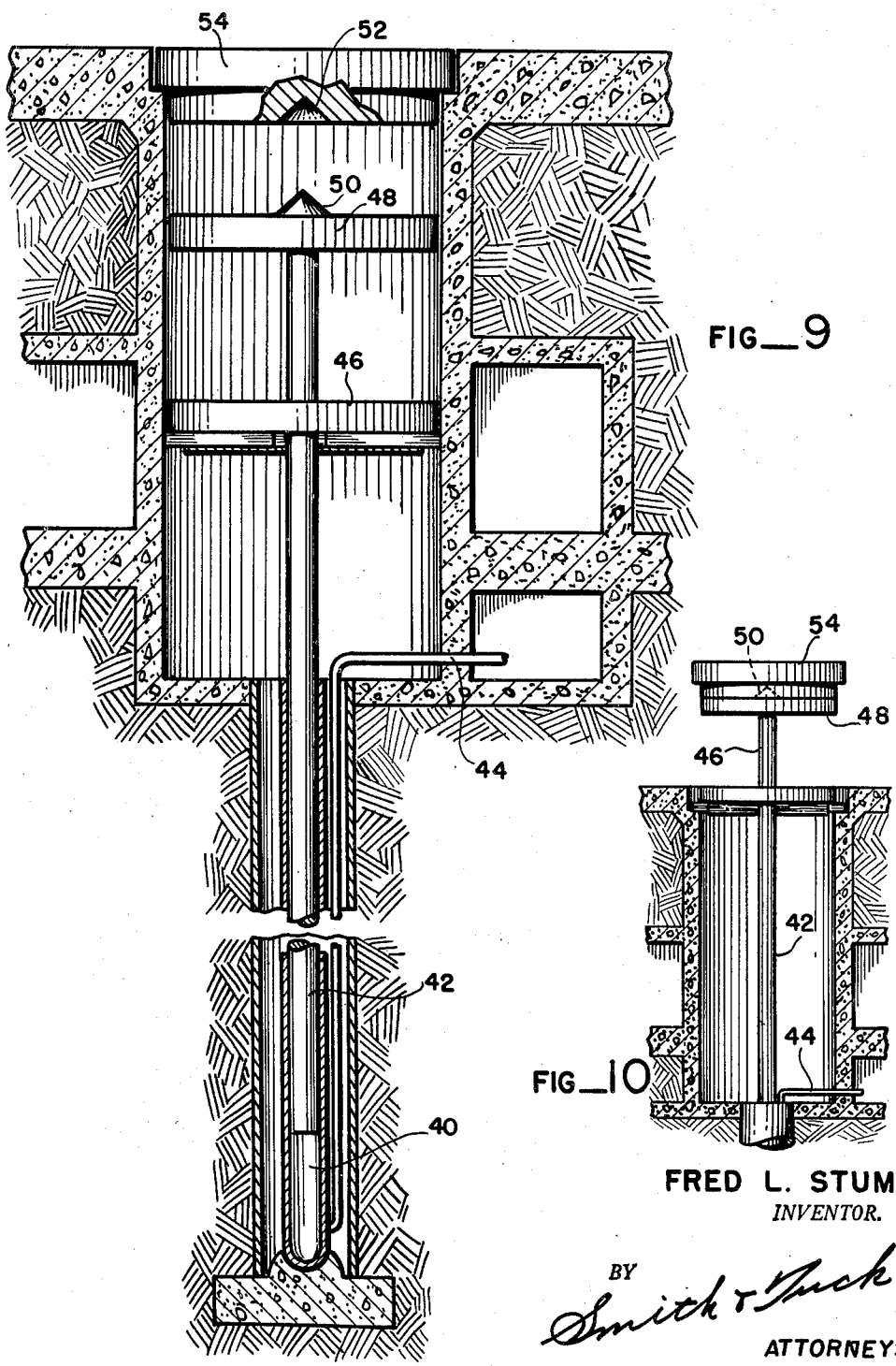
FRED L. STUMP
*INVENTOR.*
BY *Smith & Tuck*
ATTORNEYS

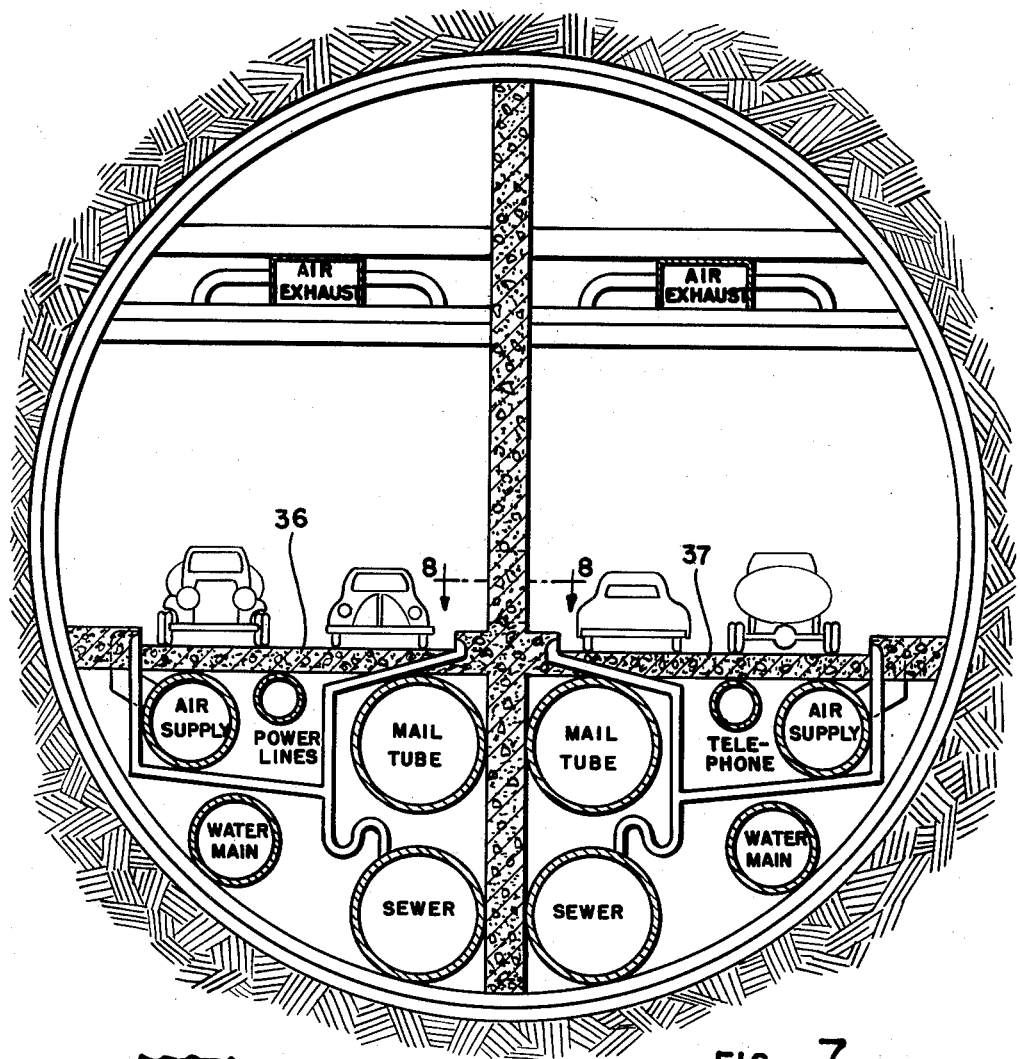
FIG_7
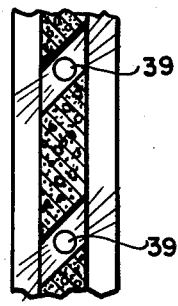
FIG_8

Patented Sept. 12, 1950

2,522,144

UNITED STATES PATENT OFFICE 2,522,144

INTEGRATED AIRPORT

Fred L. Stump, Seattle, Wash.

Application August 18, 1947, Serial No. 769,087

6 Claims. (Cl. 244—114)

My present invention relates to air-line terminal facilities and, more particularly, to an integrated airport.

Present day airport facilities are, most generally, just a matter of the gradual expansion of early established facilities which have been increased as air travel has increased. As a result of this policy, and with only a very few noteworthy exceptions, airports are usually too closely located to our various centers of population. In too many cases it is being found that as the planes increase in size and require larger and wider runways and the number of planes increases, the earlier conceived airports are now wholly inadequate and, when endeavors are undertaken to expand these existing airport facilities, it is either at the cost of great expense or at the sacrifice of convenience and safety. Often natural barriers cannot be overcome.

In my present integrated airport, I have provided what I believe to be an intelligently integrated plan whereby adequate landing runway facilities are provided, so that a great number of planes, large and small, can be accommodated and that these landing strips will be not accidental, but carefully planned as to their ground location.

It is most desirable that such facilities be well outside of metropolitan areas. Preferably, a well designed airport will, in most cases, serve two metropolitan areas and, preferably, will be located on a superhighway connecting such areas. Such an airport should be so spaced from either, that, on one hand, passengers will not be greatly inconvenienced in going to and from the airport, and more important, the airports will keep the heavy plane traffic away from crowded metropolitan districts where the hazards to the flying personnel are greatly increased and where the aircraft themselves present great hazards to the densely populated areas.

To overcome these present observed deficiencies, I propose, in addition to well planned and sited landing strips, to have runways for large and small planes, which will take into account prevailing and alternate winds, and to group around the airport, in an orderly planned scheme all the various facilities that such a large specialized facility should maintain. There will be space for business, factory, residential, church, school, and other like facilities, but by adequately planning these facilities, they can be convenient for the personnel to be served, and by planning, the taller structures can be kept away from the landing fields and out of the line of the runways so as to minimize danger or hazards in takeoffs and landings.

The principal object of my present invention, therefore, is to have an airport and the necessary facilities, which in themselves are practically a city, so designed for comfort, convenience, compactness, and attractiveness, that it lends itself to the modern mode of living. A further object of my invention is to provide an airport facility, which, by overall planning, will permit an efficient arrangement at a greatly reduced overall cost.

A further object of my invention is to provide an airport and associated facilities in which, by advanced planning, many of the various items that are essential for the daily operation of such an airport will be placed underground, adding greatly to the convenience of the arrangement and immeasurably to the safety of the air borne traffic and the ground traffic associated therewith.

A further object of my present invention is the incorporation of the necessary streets which will provide access to the associated facilities, which will be arranged concentrically about the center of the airport and will have connecting radially disposed cross streets so that the general plan of a solar system will be in effect, and by naming these concentric streets after the elements of a solar system, an arrangement will be provided which, if followed in the creation of a series of such airports, will aid the travelling users of such airport facilities very much.

A further object of my present invention is to provide definitely planned areas for the essential hangars used in any planned airport.

A further object of my invention is to make liberal use of underground avenues of transportation, including ramps and elevators, so that passengers, freight and mail can be separately handled and handled with speed and safety.

A further object of my invention is to provide very definitely for the proper and adequate placement of such facilities as the control tower of the airport, and for grandstands that will have an adequate uninterrupted view, and for the other essential secondary facilities that add so much to the enjoyment of living and to the overall efficiency of such a large installation.

A further object is to provide essential facilities for a major airport so protected by ground cover as to function during periods of enemy bombing as in war time.

A further object is to so arrange an airport that it will lend itself to shows and expositions and be capable of handling large groups of people most expeditiously.

Further objects, advantages, and capabilities will be apparent from the description and disclosure in the drawings or may be comprehended or are inherent in the device.

Figure 1 is a plan view of an airport built after the principles of my present invention.

Figures 2, 3, and 4 are cross-sectional views taken along similarly numbered lines of Figure 1 in which the vertical scale is enlarged for illustrative purposes.

Figure 5 is an enlarged plan view of a portion of Figure 1.

Figure 6 is an enlarged detail view of a small portion of Figure 1, shown as cut by a horizontal plane so as to show the underground structures employed.

Figure 7 is a typical vertical cross-sectional view taken through one of the main tunnels which cross beneath the ground surface in my airport arrangement.

Figure 8 is a detailed view in section taken along the line 8—8 of Figure 7.

Figure 9 is a vertical sectional view through one of the large hydraulic elevators employed in my airport arrangement.

Figure 10 is a view on a reduced scale but otherwise similar to Figure 9 and showing my elevator in its raised position.

Referring more particularly to the disclosure in the drawings, the numerals 12, 13, and 14 designate the principal runways employed in my integrated airport. These runways should be of a size to meet fully the requirements of the largest types of planes that it is anticipated will be employed on this airport during its normal lifetime, and it is deemed necessary in following out the principles of my invention, to employ not less than three of these principal runways, which should be so disposed as to take advantage of the prevailing winds of the community. Disposed normally at right angles to the three main runways is a fourth runway of equivalent size for use during periods of changing winds. This I have designated by the reference character 15.

Traversing my airport so as to meet at a central point at substantially right angles to each other but at slightly different elevations so they will not interfere with each other, are arterial tunnels as 17 and 18.

Disposed about the central point of my airport are a series of concentric streets or circles, which it is recommended should take the names of the solar system, to the end that, should the plan be approved and put into large scale operation throughout the country, passengers becoming familiar with the planning at one such installation, will be served by such a general system with the minimum of uncertainty and inconvenience. Each of these circles or curved streets will be formed as tunnels at each point where they would normally cross the airplane runways. These have been indicated in Figure 1 by dotted lines.

Following the principles of my invention all crossing to and from the airport proper will be handled by tunnels so that high speed traffic can be maintained up to the point of discharge or embarking of passengers, mail, freight or express, all with the general plan of preventing waste of time or rehandling of either passengers or packaged goods.

Referring to Figure 6, it is to be noted that I have illustrated a small portion, designated by the reference character 23 in Figure 1, and which in Figure 6 is shown on a much increased scale. It is to be noted that, in this showing, one of the super-highway tunnels, as 17, traverses the area from end to end, with two one-way traffic roadways. Additional tunnels, as 20 and 21, connect respectively to other units of a similar character, of which I have indicated four in Figure 1.

In Figure 6, I have indicated one typical use of this subterranean facility, namely, rooms for mail, express and freight, and the passenger areas. These various facilities are either connected by the multiplicity of tunnels through their associated facilities, or the passengers and the freight express and mail can be raised by the plurality of elevators, denoted generally by the reference character 25. With proper runway clearances for safety from landing or taking-off planes, access to the ground surface can be achieved by the hydraulic elevators, which I have shown in Figure 9 and which will be explained more specifically later.

Reference is now made to Figures 2, 3, and 4, which are typical sectional views along their similarly numbered lines in Figure 1. These show the main high-speed and facility tunnels 17 and 18, and the multiplicity of smaller tunnels which are the underground communicating means to various essential parts of the system. In Figure 2, it will be noted that one of the small tunnels 20 is illustrated. Further to the left will benoted the four tunnels which represent the circular streets designated M, E, V, and M', which in a preferred naming plan would be Mars, Earth, Venus and Mercury, Mercury being the M'.

In Figure 3 I have taken a section through the monumental area 27, and showing communication from circle Mercury to tunnel 17, at 30, which can also be identified in Figure 5 at 30. At the outer end of tunnel 17 I have provided the up-ramp 32 which is indicated also at 32 in Figure 1.

In Figure 4 will be noted the manner in which the various circles or circular streets pass in the vicinity of the large hangars 55.

For a fuller understanding of my super-tunnels 17 and 18, reference is made to the cross-sectional view of Figure 7, in which the various utilities are supplied through the tubes which underlie the two roadways as 36 and 37, the intent being to have one-way traffic on each of these two roadways. For the sake of ease of understanding, the various tubes throughout this cross section are lettered with their intended use.

The horizontal sectional view in Figure 8 illustrates the manner in which I provide lighting for my traffic lanes which is so arranged that the lights 39 will be effective where desired and still will not be in a position so as to be visible to the extent that they might be blinding or confusing to automobile operators.

It will be readily understood it is believed that no system of underground tunnels will be effective unless easy means are available for communication between those subterranean passageways and the surface, and to this end, I have provided a plurality of elevators of the type illustrated more fully in Figures 9 and 10. In the showing of Figures 9 and 10 I have for the sake of ease of understanding shown my elevators in their simplest form. They consist essentially of the hydraulic cylinders 40 in which I dispose, for vertical movement, the elevator pistons 42. These are caused to function by liquid under pressure being introduced through pipe 44, applied pressure causing elevator piston and its associated parts to rise, and a release of this pressure causing it to descend due to gravity acting upon the heavy mass of the elevator.

My elevator proper consists of the lower load carrying platform 46, which shall be of a size to carry the various loads either freight, express, mail or human passengers and protection is afforded by an upper protective cover 48. Extending above cover 48 is a conical portion 50 which is adapted to engage and to be centered in the conical recess 52 formed in the surface sealing plate 54. This plate is intended to be of substantial construction, properly designed so as to permit the maximum loading that might ever occur on it such as a plane, which might for any reason get out of control or which might cross over it. On occasions it might be necessary to employ heavy tankers or plane recovering units that would greatly exceed the normal weight of customary vehicles. In Figure 10 I have illustrated my elevator with its load carrying platform 46 flush with the surface of the ground and adequately supporting the sealing cover 54. This is achieved by centering cone 50 and the fact that the lower rim of cover 54 rests upon the protective cover 48. By having an adequate number of these elevators, a large amount of traffic can be handled very quickly and this is one of the essential requirements of my plan.

Disposed in the end spaces between the three principal runways I provide plane hangars 55 for storage and maneuvering. In the annular area adjacent the underground facilities I provide a plurality of repair and service hangars 57.

To carry out fully my plan, I have provided in the present showing four monumental areas 27. These I prefer to back up with a grand stand as 69, so that large groups of people can be assembled for any function that may be properly held in this airport arrangement. I have further provided on the surface the parking facility shown at 62, where it will be noted from the direction of traffic that the cars pass around to the parking areas and are required to back into these various parking stalls which have been laid out as shown in Figure 5. This means that as a crowd assembles and time is available for parking the cars, the cars can be stopped and backed into position and then when the ceremonies are concluded, they can start out without the necessity of stopping and backing but rather can drive out with merely a simple turn. This facility is also shown at 64, and operates in the same general manner.

I have further provided the facility shown at 66. Here I have arranged for the control tower, an air beacon and a plurality of stepped stories which provide an excellent elevated view point for all activities on the field. By placing tower 66 in the southeast quadrant, minimum disturbance is caused by the sun's rays and the tall tower is well out of the way of any planes using the runways.

It is believed that it will be clearly apparent from the above description and the disclosure in the drawings that the invention comprehends a novel construction of an integrated airport.

Having thus described my invention, I claim:

1. An integrated airport, consisting of: a plurality of airplane runways; a plurality of high-speed traffic tunnels crossing each other at approximately the mid-point of said airport; a plurality of communicating tunnels adapted to supply the various transportation conveniences and utility services required by a large airport installation; a plurality of underground rooms; a plurality of elevators adapted to provide free communication between said rooms and the airport surface; a plurality of circular streets disposed orbit fashion about the crossing point of said high-speed traffic tunnels; a plurality of cross streets radially disposed from said crossing point and tunnels carrying said circular streets under the airplane runways.

2. An integrated airport, consisting of: a plurality of airplane runways; a plurality of high-speed traffic tunnels crossing each other at approximately the mid-point of said airport; a plurality of communicating tunnels adapted to supply the various transportation conveniences and utility services required by a large airport installation; a plurality of underground rooms; a plurality of elevators adapted to provide free communication between said rooms and the airport surface; a plurality of circular streets disposed concentrically about the approximate center of said airport; and a plurality of monumental areas grouped equidistant about the inner circular street each providing a grandstand and car parking facilities to provide in the aggregate a planned exposition or show area.

3. An integrated airport, consisting of: a plurality of airplane runways; a plurality of high-speed traffic tunnels crossing each other at approximately the mid-point of said airport; a plurality of communicating tunnels adapted to supply the various transportation conveniences and utility services required by a large airport installation; a plurality of underground rooms; a plurality of elevators adapted to provide free communication between said rooms and the airport surface, and an annular arrangement of streets and avenues disposed around said airport, of sufficient extent to provide business and residental areas adequate to supply the needs of all the personnel living at said airport or passing therethrough.

4. An integrated airport, comprising: three parallel, spaced, runways disposed in the direction of the prevailing wind; a single runway disposed substantially at right angles to said parallel runways and intersecting the same at substantially their mid-points; a plurality of circular streets, concentrically disposed about the point of intersection of said runways; arcuate tunnels under said parallel runways in a prolongation of said circular streets; ramps joining said tunnels and said streets.

5. An integrated airport, comprising: a plurality of parallel, spaced, runways disposed in the direction of the prevailing wind; a single runway disposed substantially at right angles to said parallel runways and intersecting the same at substantially their mid-points; a plurality of circular streets, concentrically disposed about the point of intersection of said runways; arcuate tunnels under said parallel runways in a prolongation of said circular streets; ramps joining said tunnels and said streets; and hangars disposed between said spaced runways.

6. An integrated airport, comprising: three parallel, spaced, runways disposed in the direction of the prevailing wind; a single runway disposed substantially at right angles to said parallel runways and intersecting the same at substantially their mid-points; a plurality of circular streets, concentrically disposed about the point of intersection of said runways and interrupted by said runways; tunnels under said parallel runways connecting the interrupted ends of said circular streets; ramps joining said tunnels and said streets.

FRED L. STUMP.

REFERENCES CITED

The following references are of record in the file of this patent:

UNITED STATES PATENTS

| Number | Name | Date |
|---|---|---|
| 1,753,574 | Loth | Apr. 8, 1930 |
| 1,850,490 | Bahl | Mar. 22, 1932 |
| 2,400,841 | Rogers | May 21, 1946 |
| 2,421,512 | Leitch | June 3, 1947 |

OTHER REFERENCES

"Scientific American," pp. 481 and 486, Dec. 29, 1906.

"Scientific American," pp. 433 and 439, May 28, 1910.

"Engineering News," page 347, Mar. 1, 1917.